Feb. 8, 1927. 1,617,309
A. E. SCHEIN
STABILIZING GYROSCOPE
Filed Oct. 30, 1917 6 Sheets-Sheet 2
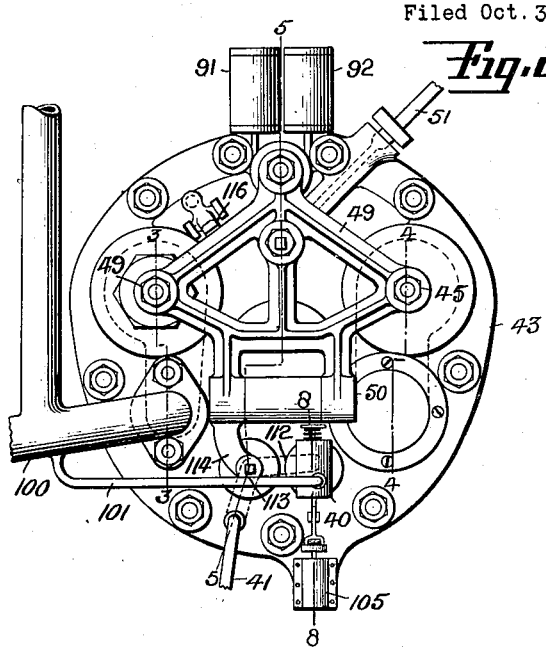
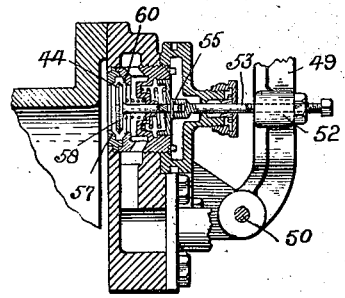
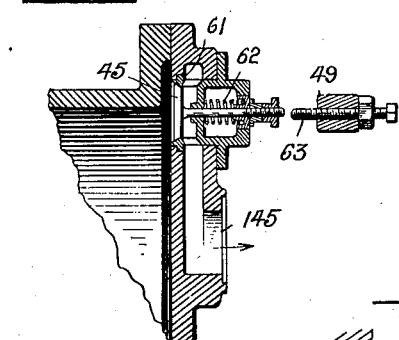
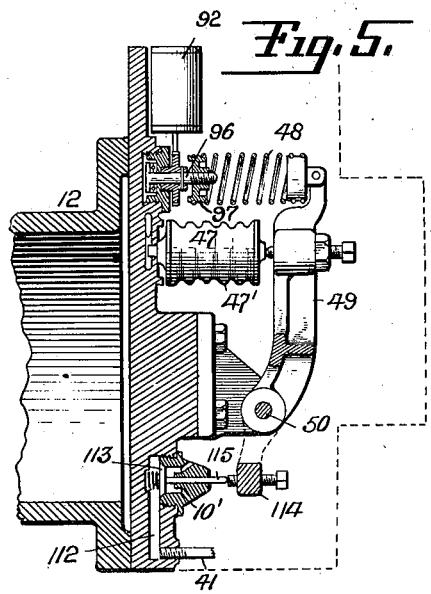
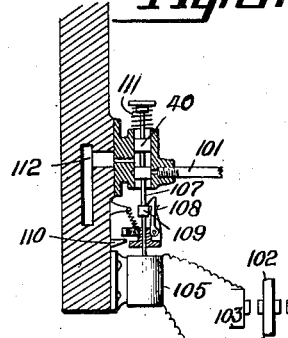
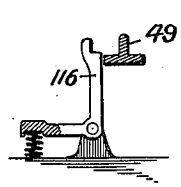
INVENTOR
ALEXANDER E. SCHEIN.
BY
Herbert H. Thompson
ATTORNEY Feb. 8, 1927.
A. E. SCHEIN
1,617,309
STABILIZING GYROSCOPE
Filed Oct. 30, 1917  6 Sheets-Sheet 3
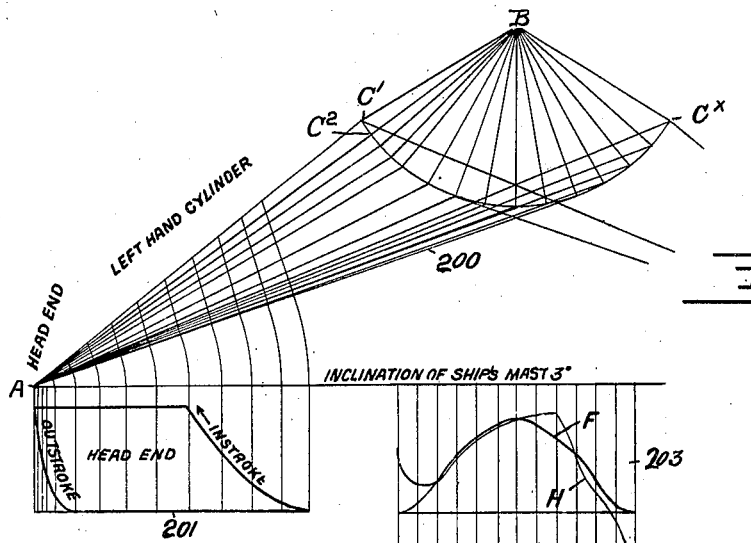
_Fig.16._
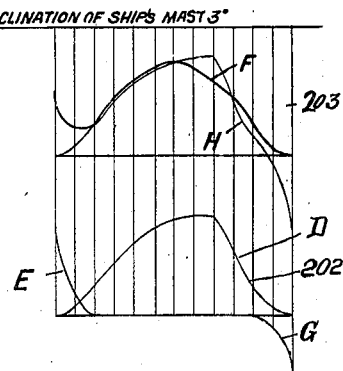
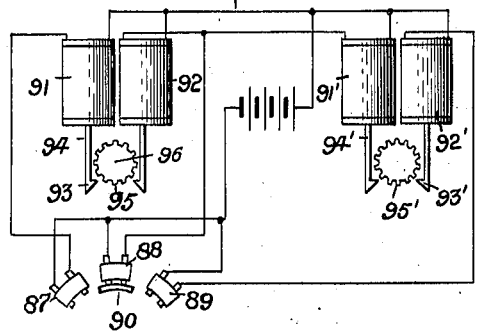
_Fig.6._
INVENTOR
Alexander E. Schein.
BY
Herbert H. Thompson,
ATTORNEY.

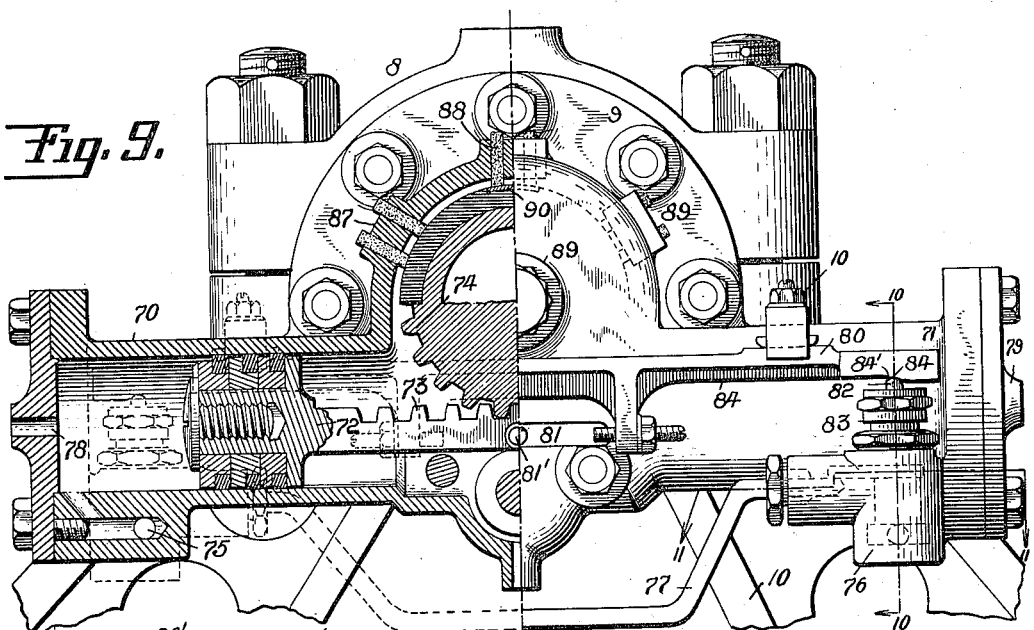

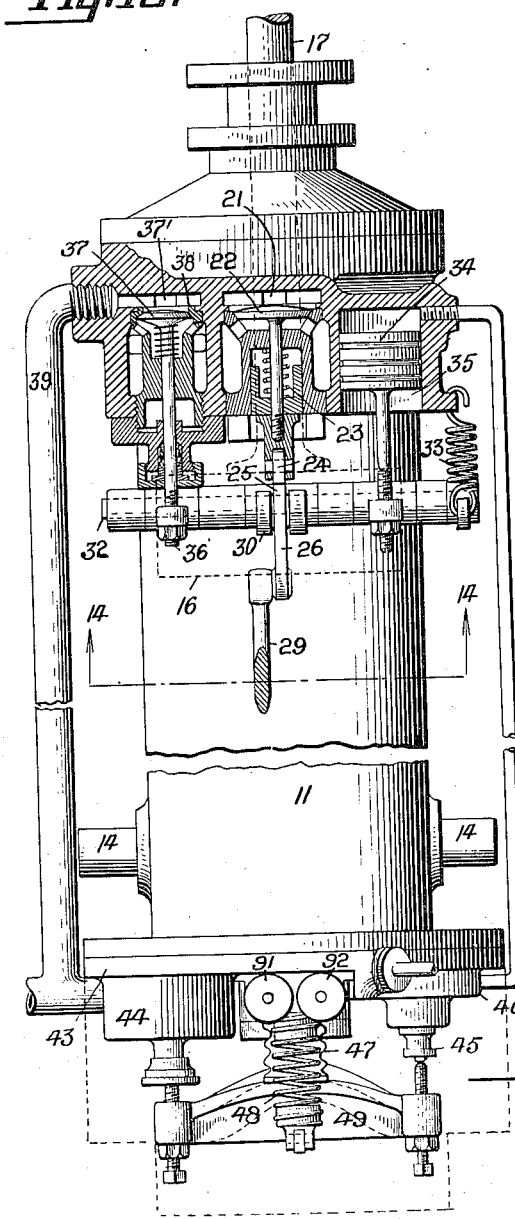
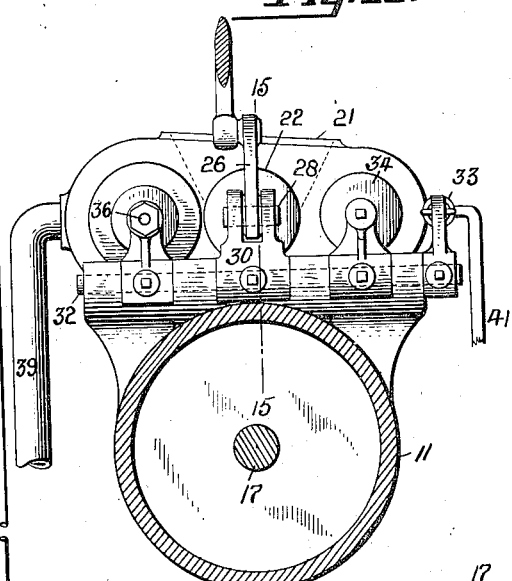
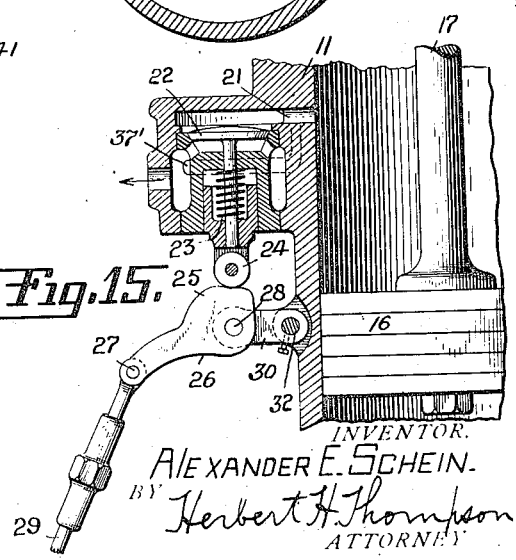

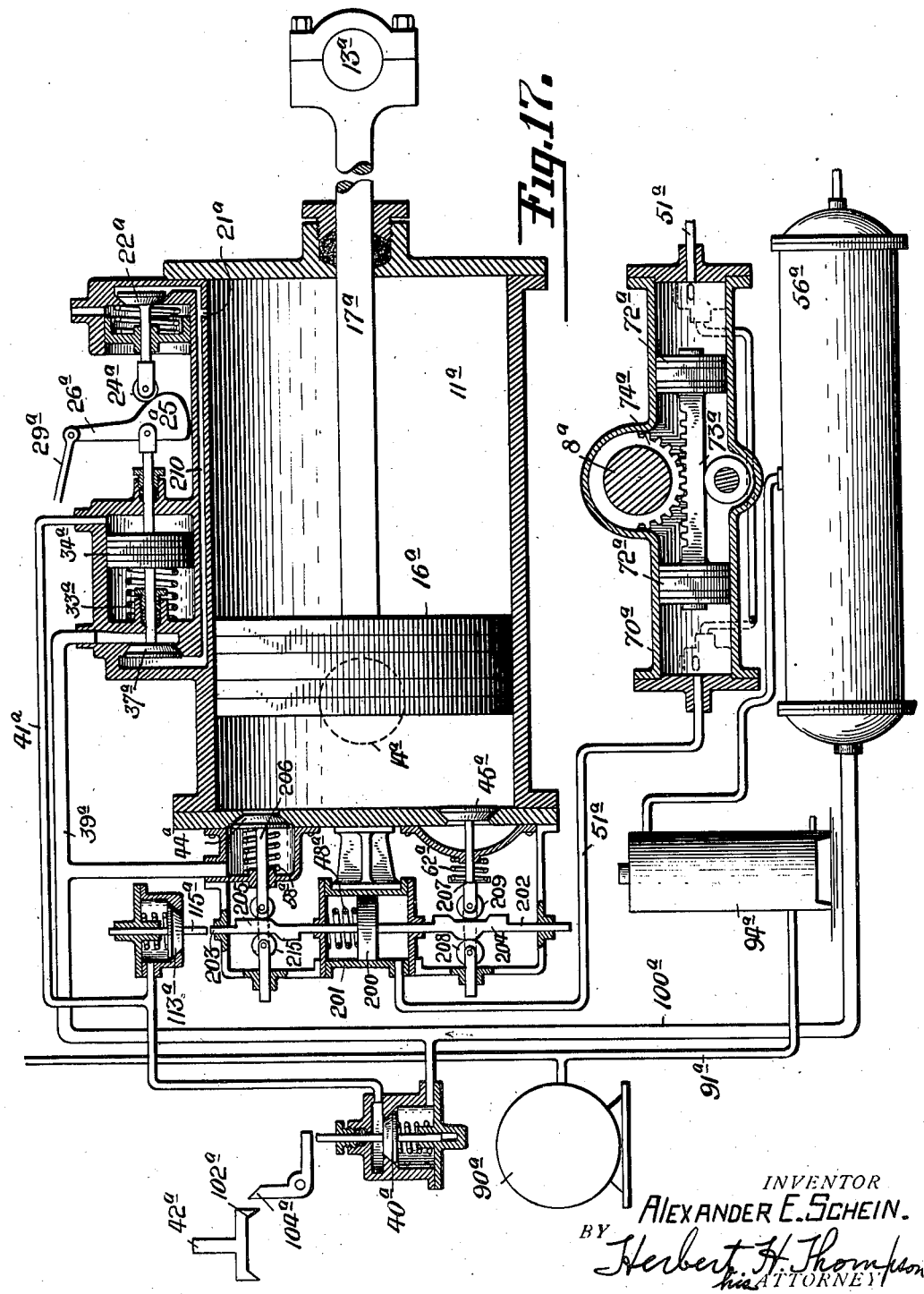

Patented Feb. 8, 1927.

1,617,309

UNITED STATES PATENT OFFICE.

ALEXANDER E. SCHEIN, OF BROOKLYN, NEW YORK, ASSIGNOR TO THE SPERRY GYROSCOPE COMPANY, OF BROOKLYN, NEW YORK, A CORPORATION OF NEW YORK.

STABILIZING GYROSCOPE.

Application filed October 30, 1917. Serial No. 199,273.

This invention relates to the control of gyroscopes of large size such as used for stabilizing and rolling ships. One of the particular objects of the invention is to improve upon the present systems of braking such gyroscopes about their precession axes whereby smoother and more uniform action is secured and much less heat is produced. A further object is to utilize the energy normally absorbed by the brake of the gyroscope for producing useful work instead of being wasted in heat.

A further object of the invention is to insure a centralized action of the gyroscope;
in other words, to prevent the gyroscope working over to one portion of its natural arc of oscillation.

A still further object of the invention is to improve upon the present construction of the so-called active type of gyroscope wherein the precession is accelerated during the preliminary stages of a precessional oscillation in either direction. According to such systems as now constructed, an electric motor known as a precession motor is utilized to impart acceleration to the gyroscope. This motor requires heavy, fluctuating currents. According to my invention, the necessity for employing such a motor is eliminated and at the same time the advantages of accelerated precession are retained by employing the braking cylinders for such purpose. Preferably compressed air or other elastic fluid is made use of in said cylinders for such purposes, the outlet being cut off at a predetermined interval before the end of the stroke, whereby highly compressed air is trapped in the cylinder and the gyroscope is given an accelerating thrust at the beginning of the outward stroke.

Referring to the drawings in which what I now consider the preferred forms of my invention are shown:

Fig. 2 is a rear elevation of one of the brake cylinders showing the valve operating mechanism mounted thereon.
Fig. 3 is a section on line 3—3 of Fig. 2.

Fig. 4 is a part section on line 4—4 of Fig. 2.

Fig. 5 is a section on line 5—5 of Fig. 2.

Fig. 6 is a side elevation of a top portion of Fig. 5.

Fig. 7 is a detail of a catch shown also in Fig. 2.

Fig. 8 is a section approximately on line 8—8, Fig. 2.

Fig. 9 is an enlarged side elevation partly in section of the horizontal gudgeon of the main gyroscope, showing the hydraulic governing means secured thereto.

Fig. 10 is a section on line 10—10 of Fig. 9 in the direction of the arrow.

Fig. 11 is a section on approximately line 11—11, of Fig. 9 looking in the direction of the arrow.

Fig. 12 is a longitudinal section of a brake cylinder showing simplified forms of piston valves for operating the same.

Fig. 13 is a plan view partly in section of the valve mechanism mounted near the forward end of the brake cylinder.

Fig. 14 is a section approximately on line 14—14 of Fig. 13 in the direction of the arrow.

Fig. 15 is a detached sectional view on approximately line 15—15, Fig. 14.

Fig. 16 is a diagram illustrating certain advantages of my invention.

Fig. 17 is a diagram illustrating the joint action of the valves on one of the brake cylinders.

Figure 1:
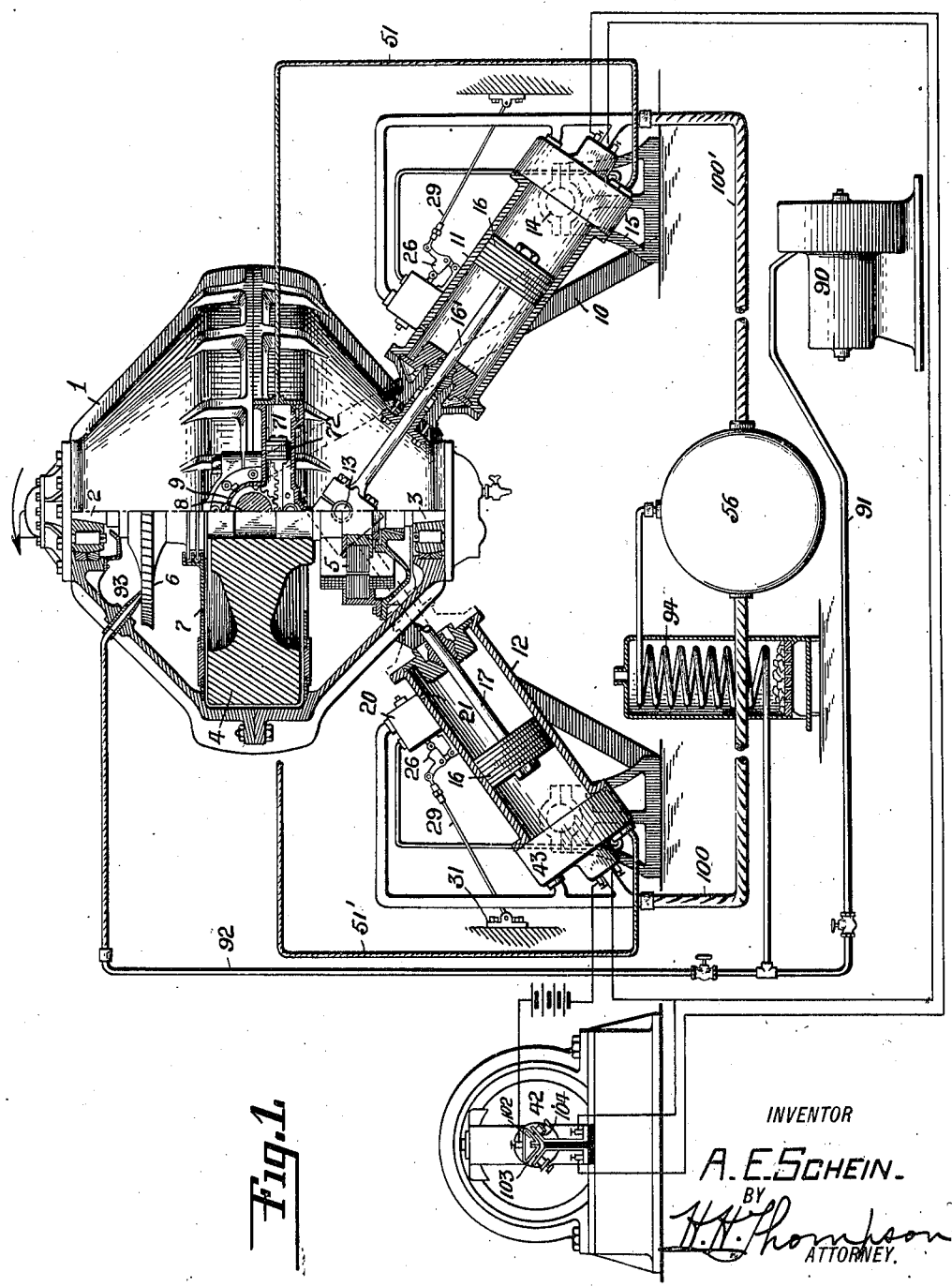
Fig. 1 is a side elevation partly in section of a ship's gyroscope, said parts being shown diagrammatically.

To illustrate my invention I have shown a large gyroscope comprising a casing 1, containing bearings 2 and 3, in which is journaled the rotor 4 of the gyroscope. Said rotor may be either electrically driven as by means of the motor 5 or may be driven by a turbine wheel 6, said drives acting either separately or in conjunction as hereinafter explained.

Preferably fly wheel or rotor 4 is rotated in a vacuum, a partition 7 being provided to exclude the gases or other fluid used to operate the turbine from access to the rotor.

The casing is journaled upon gudgeons 8 which in this instance are shown as normally horizontal; the spinning axis being shown as vertical. If said apparatus were placed upon a ship for stabilizing it against rolling, it will be understood that the gudgeon axis 8 is placed athwartships. Said gudgeon is supported by a bearing 9 on brackets 10, the forward bracket being cut away in Fig. 1 for the sake of clearness.

In order to control and brake the oscillation of the gyroscope about the gudgeons 8 I prefer to employ one or more brake pumps or cylinders 11—12, the piston rods 16' of which are shown as pivoted to the gyro casing at 13. Each cylinder is pivotally mounted on trunnions 14 about an axis parallel to axis 8 so that as the gyroscope precesses the cylinders will be oscillated on the trunnions. The trunnions are shown as supported in brackets 15. Preferably the brake cylinders are angularly positioned both with respect to each other and to the central, or in this instance, the vertical position of the gyroscope. The cylinders are placed at a substantially equal angle to the said vertical position and at such an angle that the resistance offered by the brakes during an oscillation of the gyroscope varies approximately in proportion with the variable precessional forces exerted by the gyroscope.

Heretofore, so far as I am aware, it has not been appreciated that the force exerted by the gyroscope varies from point to point during its oscillation, being the maximum when the gyroscope is passing through its central position and decreasing in accordance with a function of the cosine of the angle as the gyroscope precesses further away from the central position.

By properly positioning the brake cylinder I have been able to devise a brake which exerts a variable force which substantially approximates the force exerted by the gyroscope.

My preferred method of positioning the cylinders is illustrated graphically in Fig. 16. In diagram 200 of this figure the point A represents the axis of oscillation of the cylinder 11, point B, the axis of oscillation of the gyroscope, and points $C_1$, $C_2$, $Cx$, etc. represent the various positions assumed by the point of attachment of the piston rod to the gyroscope. From this diagram the force of the piston in the direction to brake the gyroscope may be readily resolved. Immediately below this diagram at 201 is plotted an indicator diagram for the head or outer end of the cylinder during a complete stroke. At 202 the two diagrams are represented as combined in a curve D, representing the work done by one piston in braking the gyroscope. Also placed in this diagram is a curve E representing the resisting moment due to compression at the inner end of the other cylinder, i. e., due to trapped air hereinafter described. A curve G is also shown which represents the accelerating moment due to said trapped air.

In diagram 203, the curve F represents the gyroscopic moment, i. e., the passive gyroscopic force caused by the roll of the ship which must be opposed and nullified by the brake; while the curve H represents the summation of the turning or braking moments due to the air pressures in the cylinders, or in other words, the summation of curves D, E and G. It will be noted that the two curves F and H are very nearly coincident, which is the condition desired. While this arrangement of the cylinder will give approximately the desired braking effect, I prefer to employ in addition another regulating device as hereinafter explained.

Preferably both ends of each cylinder are made use of but for somewhat different functions, the outer ends being used to limit the speed of precession of the gyroscope and perform a greater portion of the braking effect, while, the inner ends are used to add to the braking effect at the end of the stroke and preferably also to exert an accelerating torque or "kick" on the gyroscope at the beginning of the new stroke.

Taking up first, the valve mechanism at the inner end of each cylinder, said mechanism is shown as enclosed within a housing 20 in Fig. 1, said housing being secured to the walls of the cylinder and communicating therewith through an opening 21 therein. Said opening 21 acts as an exhaust port, but the exhaust is controlled through a valve 22 within said housing (see Figs. 13, 14 and 15). Said valve is yieldingly pressed down on its seat by spring 23, but is lifted in either of two events. The outer end of the valve stem is shown as supporting a roller 24 against which bears a cam surface 25 on an arm 26 which is pivoted at 27 and 28 to a link 29 and to an arm 30, respectively. The former is pivoted adjacent its other end to the fixed abutment 31 so that the cam member 26 is oscillated as the cylinder oscillates on its trunnions. The latter member 30 is secured to a rocker shaft 32 extending across the cylinder in Figs. 13 and 14. The said rocker shaft is normally rotated upwardly by spring 33, which is much stronger than spring 23 but is moved at predetermined intervals in the opposite direction by piston 34 within the cylinder 35. The actuation of the piston is controlled by a device which is responsive to the direction of roll of the ship, such as a small auxiliary gyroscope 42 as hereinafter described.

It will readily be seen that the spring 33 and the shaft 32 will normally hold the valve 22 off its seat if cam 25 is turned properly so that free access is had to the air but that either turning of the cam 25 or the operation of the rocker shaft 32 or both will cause the valve to close. Also connected to said rocker shaft is the valve stem 36 of a valve 37 normally maintained against its seat 38 by the said spring 33. Said valve leads from an intake 39 through a port 37' into the cylinder. Upon actuation of the piston valve 34, valve 37 is opened, thus allowing compressed air or other working fluid to be admitted through pipe 39 into the upper end of the cylinder. The operation of this portion of the invention is as follows:

As the piston 16 approaches the outer end of the stroke, the valve 22 which is normally open, as explained, will be closed by the turning of cam 25 through the medium of rod 29 thereby closing the valve and trapping air in the end of the cylinder. As the piston at this time is moving very nearly as fast as the gyroscope, the compression of this air within the cylinder will powerfully and rapidly brake the gyroscope. The said compressed air is then retained within the cylinder until it has expanded against the piston on the return stroke thereby accelerating the precession for a predetermined period, i. e., until the valve 22 is allowed to open by the movement of rod 29.

The above described action will occur however only if the gyroscope moves to the end of its oscillation. If, however, the gyroscope does not do so, but reverses its direction of oscillation before reaching the said limit, compressed air is admitted into the cylinder at or near the point of reversal through the opening of valve 37. As above explained, said valve is opened through the downward movement of piston 34 which is in turn preferably controlled from the auxiliary gyroscope 42. For this purpose, a valve 40, shown as positioned on the opposite end of the cylinder, is connected to cylinder 35 through a pipe 41, (Figs. 2, 5 and 8). The said valve 40 is in connection with the supply tank 56 (Fig. 1) through main supply pipe 100 and auxiliary pipe 101 (Figs. 2 and 8) and is preferably controlled by said gyroscope 42 as follows: As gyroscope 42 precesses one way or the other, it brings a contact 102 thereon into engagement with one or the other of fixed contacts 103 or 104 thereby exciting one or the other of solenoids 105 or 106 on cylinders 11 and 12 respectively (Figs. 2 and 3). The core of each solenoid is connected to the valve stem 107 of valve 40 by means of a pivoted catch 108 secured to collar 108' on an extension 108'' of the core. Said catch normally engages a collar 109 at the end of the valve stem. Upon the solenoid being excited, valve 40 is withdrawn until catch 108 is tripped by pin 110, whereupon valve 40 is returned to its closed position by spring 111. By this or equivalent arrangement, a charge of compressed air is admitted into cylinder 35 through the following parts: pipes 101, valve 40, passage 112 (Figs. 2, 5 and 8) and pipe 41, thus opening valve 37 and admitting compressed air into the inner end of cylinder 11. As soon as the speed of precession reaches a predetermined value, however, this air is exhausted. For this purpose a vent valve 113 (Figs. 2 and 5) is located in passage 112 or other point in the path between valve 40 and cylinder 35 said valve being opened by the rocking of lever 49 (hereinafter described) the foot 114 of which engages the valve stem 115. This will permit spring 33 to close valve 37 and open valve 22. The cylinder head 43 is also shown as equipped with a plurality of other valves including inlet valve 44, outlet valve 45, and the control valve 40. Both the inlet and exhaust valves are shown as actuated by a sylphon or flexible wall container 47 which raises against the action of spring 48, an irregular shaped lever 49 pivoted at 50. The sylphon proper is shown as consisting of an elastic or expansible container 47' which is in communication through a pipe 51 with a hydraulic speed governor or the like on the main gyroscope. A safety catch 116 (Figs. 2 and 7) is shown for locking the lever in a raised position, in case the sylphon fails, thereby applying the brakes with their maximum pressure as will become apparent.

Arm 52 of said lever is shown as resting by means of adjustable rods 53 threaded through lever 49, upon the valve stem 53 of valve 44 through a lost motion or pin and slot connection 55. Said valve when open as shown in Fig. 3, places the far end of the cylinder in communication with the storage reservoir or tank 56 and when closed traps the air within the brake cylinder thereby increasing or decreasing the pressure therein depending upon whether the pressure at the time in the cylinder is greater or less than the pressure in the tank. Both an inner seat 57 and an outer seat 60 are preferably provided for the valve. Said valve 44 is normally maintained on the inner seat 57 by means of spring 58 so that as the piston starts to move on its outward stroke, the valve remains closed, due to lost motion connection 55. Valve 45, also is immediately closed. If, during the said stroke the speed of precession rises above a predetermined value, the lever 49 will rise slightly thereby unseating the valve and allowing the air from the tank to flow into the cylinder thereby increasing the braking effect by bringing the pressure in the cylinder up to the pressure of the tank. If the speed of precession continues to increase the valve is lifted still further and is seated upon the outer seat 60 thereby trapping the compressed air in the cylinder and offering further resistance. As soon, of course, as the speed drops again the valve is opened and the cylinder placed in communication with the tank so that compressed air is thereby pumped into the tank.

The outlet valve 45 is normally maintained up against seat 61 by spring 62 and is unseated upon engagement of set screw 63 in lever 49 of the valve stem. The said parts are so positioned that the valve is open when precession is started in a direction to cause inward movement of the piston 16. But as soon as any movement takes place, sylphon 47 raises the adjacent end of lever 49 thereby allowing valve 45 to become seated on seat 61 thereby cutting off the exhaust through port 145.

One form of hydraulic governor for actuating the sylphon is shown in detail in Fig. 9 and generally in Fig. 1. It is mounted adjacent a gudgeon 8 of the gyroscope and comprises a pair of cylinders 70 and 71 secured to brackets 10 and having pistons 72 therein connected by a rack bar 73. Gudgeon 8 of the gyroscope is provided with teeth 74 which mesh with said rack so that as the gyroscope oscillates the piston 72 will be reciprocated. Adjacent the far ends of each cylinder 70 is a port 75 leading into a valve 76, the two valves being connected to pipe 77. As the pistons reciprocate oil or other fluid is forced from one cylinder to the other through said pipe 77, the opening through the valve being restricted so that variations in pressure on the oil take place which are proportional to a function of the speed of the piston. Said pressure is transmitted through ports 78 and 79 in the ends of the cylinders through pipes 51 and 51' to sylphons 47. Preferably the size of the restricted opening within valve 76 is varied or other means provided to centralize the gyroscope. Without some such means it is found that a stabilizing gyroscope during normal operation will tend to work to one side or the other of its normal arc of oscillation, so that instead of precessing through equal angles from its central position, it will precess to a greater extent on one side than on the other and at times will precess entirely to one side of the vertical position. This, of course, results in a marked loss of efficiency, since, as above explained, the stabilizing effect of the gyroscope varies, with a function of the angle that the gyroscope is assuming at the time with respect to its central position. Furthermore, many other disadvantages arise when the gyroscope is not centralized. For effecting this important purpose a cam bar 80 is shown as secured to the bar 73 by links 81 and pin 81' Fig. 9 so that the said bar is moved with the piston. The stem 82 of each of the valves 76 projects upwardly through stuffing box 83 and engages the under surface 84 of said bar. At a predetermined point near the end of the bar an inclined surface 84' is provided which depresses valve 76 against the action of spring 85 thus furnishing a larger opening for the passage of the oil. The under surface of the bar is so positioned that the valve is maintained off its seat a limited amount at all times. If the gyroscope is precessing a limited amount on equal sides of the central position, the two valves 76 remain open an equal amount so that equal pressures are transmitted to both sylphons 47 on the two cylinders 11 and 12. A similar action occurs when the gyroscope is precessing near the limit of its stroke on each side of the central position. If, however, it reaches the limit of its stroke on one side but not on the other, the valve 76 on the second side will be opened a greater extent thereby lowering the pressure and causing a responsive decrease in pressure within the sylphon 47 on the corresponding cylinder. This causes a decrease in the resistance opposed to precession in that direction so that the gyroscope will precess further in that direction on the next stroke.

An alternative method of centralizing the gyroscopes which may be used either separately or combined with the one described, consists in mounting a plurality of contacts 87, 88 and 89 about the axis of the gyroscope (see Fig. 9). Said contacts are secured within the bearing frame 9 and adapted to engage short conducting strip 90 which completes a circuit between the members of each pair of contacts when it is under the same. Contacts 87 and 88 are placed in the circuit respectively with solenoids 91 and 92 shown as mounted upon the end of cylinder 11. Upon excitation of solenoid 91 a tooth 93 on the core 94 of the solenoid is brought into engagement with a tooth wheel 95 (see Figs. 2, 5 and 6). Said wheel is shown as pinned to shaft 96 on which is threaded a collar 97. Said collar is secured to the lower end of tension spring 48 as shown in Fig. 5 so that on the turning of the wheel by excitation of solenoid 91 the tension on the spring is increased. When solenoid 92 is excited the reverse action takes place, as will be readily apparent. Contacts 89 and 88 are in circuit with corresponding solenoids 91' and 92' on the other cylinder 12 and are operated in a similar manner.

The air compressed by the brake pumps 11 and 12, besides being used to accelerate and brake the precession of the gyroscope, may also be employed for general power purposes such as driving an air turbine and generator 90 or the turbine wheel 6 on the rotor 4, or both. For this purpose, pipes 91 and 92 are shown connecting storage tank 56, turbine 90 and nozzle 93 on the gyroscope. A reducing valve 94' and a superheater 940 may be placed between tank 56 and the translating motors to increase the efficiency of the apparatus. The energy produced by generator 90 may be used in part to drive motor 5. In initially starting up the system, it will be understood that motor 5 may be driven from an external source of supply.

The operation of this invention is in brief as follows:

Assuming the system to be in full operation and the piston 16 of cylinder 11 starting its downward stroke with the gyroscope precessing in a direction indicated by the arrow in Fig. 1. In this position the piston of cylinder 12 is of course starting its inward stroke, the two being placed preferably 180° apart in their working sequence.

Taking up first the action of the valve mechanism at the outer end of the cylinder 11, at the beginning of the inward stroke of the piston 16, valve 44 is closed and valve 45 held open due to the engagement of the set screw 63 with the valve stem. As the speed of precession increases sylphon 47 raises the lever 49 thereby permitting valve 45 to close. Valve 44 remains unaffected, however, due to lost motion at 55 so that air is compressed in the cylinder. On further increase in the speed, valve 44 is opened thus placing the cylinder in communication with the supply tank 56 thereby increasing the braking effect and pumping air into the tank. (See indicator diagram in Fig. 16). If a further increase of speed occurs the valve 44 is brought into engagement with the outer seat 60 thereby again shutting all ports and trapping the air therewithin. As soon as the speed drops, however, the valve 44 opens again and the air is pumped into the tank. Upon the starting of the return stroke the valve 44 is closed and valve 45 opened by the collapse of sylphon 47 and the action of spring 48 in moving lever 49 thereby allowing a free intake through port 145 throughout the return stroke.

During this return stroke the valve mechanism at the inner end of the cylinder operates substantially as follows:

At the start of the stroke the valve 22 is held open and valve 37 closed by the action of spring 33. As the limit of the stroke is approached (if the gyroscope precesses that far) cam 26 is turned, due to the action of rod 29, to permit valve 22 to close, thereby trapping air in the end of the cylinder and exerting a powerful brake on the piston (see curve E in Fig. 16). Said valve remains closed until after the piston starts on the return stroke thus causing the said compressed air to impart an accelerating pressure upon the piston to accelerate precession (see curve G). The valve 22 is again opened by the turning of the cam 26 back to its original position as the cylinder turns through a predetermined angle. In case the gyroscope does not precess as far as indicated above, control gyro 42, as the ship reverses its direction of roll, completes one or the other of contacts 103 and 104 to cause valve 40 to actuate piston 34 thereby rocking shaft 32 and closing valve 22 as described above. At the same time valve 37 is opened, allowing high pressure air from the tank to enter the cylinder and impart an accelerating torque on the gyro which corresponds to the torque imparted by the trapped air. The air thus admitted to the cylinder 11 or 12 is vented, as soon as a predetermined speed is attained, by the action of valve 113 as explained.

In order that the action of the control cylinders and all of the valves connected thereto may be understood more clearly I have shown in Fig. 17 a diagrammatic representation of the cylinder and valve mechanisms above described in which all of the parts are mechanically or manually operated so that the operation may be seen at a glance. The valves and other parts are correspondingly numbered with the other figures of the drawings so that the various parts will at once be recognized. On the outer end of the cylinder 11$^a$ are located as before the outlet valve 45$^a$ and the inlet valve 44$^a$. The two valves in this instance are controlled by a piston 200 in a cylinder 201 and a spring 48$^a$ which correspond in function to the sylphon 47 and spring 48. Connected to the piston are the rods 202 and 203 on which are mounted cam surfaces 204 and 205, respectively, for actuating valves 45$^a$ and 44$^a$ against the action of the springs 62$^a$ and 58$^a$. These rods with the cam surfaces correspond in function to the large lever 49. Cooperating with the cams are a pair of rollers 215 and 208 secured to each of the valve stems 206 and 207, one roller 208 being above the cam and the other roller 209 below the cam so that the valves are positively actuated in each direction. One end of cylinder 201 is in communication with the cylinder 70$^a$ through pipe 51$^a$, as before, so as to be controlled by the speed of precession. The cam 204 is so shaped that the valve 45$^a$ is held opened at the beginning of the stroke by the action of the spring 48$^a$ while valve 44$^a$ is closed. As the speed increases, the piston 200 is moved to the full line position of the drawing permitting valve 45$^a$ to close, but valve 44$^a$ remains unaffected, however, so that air is compressed in the cylinder. On further increase of the speed the rod 202 moves further upwardly as shown in Fig. 17, and the valve 44$^a$ is opened, placing the cylinders in communication with the supply tank 56$^a$, as before. On the start of the return stroke the valve 44$^a$ is closed and the valve 45$^a$ opened by the action of the spring 48$^a$. At the same time the valve 22$^a$ of the other end of the cylinder is opened and valve 37$^a$ closed by the action of the spring 33$^a$, the cam 25$^a$ being at this time rotated so that its higher portion is under the roller 24$^a$. As the limit of the stroke is approached the cam 25$^a$ is turned as before permitting valve 22$^a$ to close. In case the gyroscope does not precess near its limit, the control gyro, as the ship reverses its direction of roll, will actuate the valve 40$^a$ through the bell-crank lever 104ᵃ thereby admitting air to move piston 34ᵃ to the left, thereby opening valve 37ᵃ and closing valve 22ᵃ. This permits high pressure air from the tank to enter the cylinder and impart an accelerating torque on the gyroscope. As soon as the predetermined speed is attained, the valve 113ᵃ is opened by the action of piston 200 which causes rod 203 to strike stem 115ᵃ of valve 113ᵃ to vent the air in the cylinder 11 by causing the opening of valve 22ᵃ as follows:

The opening of valve 113ᵃ vents the air in cylinder 35ᵃ, since it opens temporarily a small branch pipe 41ᵃ to the atmosphere. The spring 33ᵃ then moves piston 34ᵃ to the right and opens the valve 22ᵃ. Of course it should be borne in mind that at the same time that cylinder 11 is acting, the other cylinder 12 is also acting in a similar manner, but with the sequence of operation at 180° to the cylinder 11.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features, and elements in the combination and relations described, some of these may be altered and others omitted without interfering with the more general results outlined, and the invention extends to such use.

A simplified piston valve gear for accomplishing substantially the results outlined above is illustrated in Fig. 12, the parts being numbered to correspond to the other form of the invention. According to this modification a single piston valve 445 performs the functions of both of valves 44 and 45 while valve 237 accomplishes the same purpose as valves 22 and 37.

Assuming piston 16′ to be starting on its downward stroke, valve 445 would be in the approximate position shown, uncovering ports 120 and 145′ and placing that end of the cylinder in communication with the atmosphere. As the speed of the gyro increases hydraulic pressure from cylinder 70 will be transmitted through pipe 51′ to move piston 445 against the action of spring 48′. The tension of the spring may be adjusted as before by ratchet wheel 95′ and solenoids 91′ and 92′. This movement closes port 145′. Further increase in the gyro's speed will move valve 445 to a position where intake port 100′ is uncovered, whereby high pressure air is admitted through passage 121, to check the piston. If the speed continues to increase, valve 445 is moved to its extreme upper position, thereby cutting off both the supply port 100′ by covering the upper end 122 of passage 121 and the outlet port 145′.

Turning to the upper end of the cylinder, as the piston 16′ is nearing the end of its stroke, cam lever 26′ will be rotated by rod 29 as before, thus moving valve 237 down against spring 33′ to close port 21′ and trap the air in the cylinder. As the piston recedes, the trapped air is exhausted as port 21′ is uncovered. If the gyroscope does not precess far enough to effect this operation, the auxiliary gyro 42 operates to move valve 40 as before and admit air from tank 56 through pipes 101′ and 41′ and port 38′ into the upper end of valve 237 thereby moving the piston down. Upon the gyroscope picking up an appreciable speed, however, valve 113′, connected to valve 445 uncovers port 123 and vents the pipes 101′ and 41′ through port 124. This allows spring 33′ to move valve 237 upwardly cutting off the tank supply and allowing the air in the cylinder to escape.

Having described my invention, what I claim and desire to secure by Letters Patent is:

1. The combination with a gyroscope mounted for precession about an axis, of a fluid pressure means for braking the same about said axis, means for bringing said first-named means into action at the end of each precessional cycle, and means for utilizing the fluid energized by said pressure means to do work on the gyroscope.

2. The combination with a gyroscope mounted for precession about an axis, of a fluid pressure means for braking the same about said axis, and means for utilizing the fluid energized by said pressure means to accelerate the precession of the gyroscope.

3. The combination with a gyroscope mounted for precession about an axis, of a fluid pressure cylinder for braking the same about said axis, a storage reservoir connected to said cylinder adapted to maintain a predetermined pressure therein, a cut off valve and means controlled by the position of the gyroscope for closing said valve to trap fluid in the cylinder.

4. The combination with a gyroscope mounted for precession about an axis, of a fluid pressure means for braking the same about said axis, and means for utilizing the fluid energized by said pressure means to drive the rotor of the gyroscope, and for accelerating the precession of the gyroscope.

5. The combination with a gyroscope mounted for precession to a predetermined angle on either side of its central position, a plurality of brake pumps pivotally mounted adjacent and connected thereto, and positioned at an angle to each other and to said central position.

6. The combination with a gyroscope mounted for precession to a predetermined angle on either side of its central position, a plurality of brake pumps pivotally mounted adjacent and connected thereto, and positioned at such angles that the resistance offered thereby during an oscillation of the gyroscope varies approximately in proportion with the varying precessional forces thereof.

7. The combination with a gyroscope mounted for precession about an axis, of a fluid pressure means for braking the same about said axis, said means being so positioned that the resistance offered thereby during an oscillation varies approximately in proportion with the variable gyroscopic forces.

8. The combination with a gyroscope mounted for precession on either side of a central position, of a variable regenerative braking means for braking the same about said axis and means for varying said braking means responsive to the extent of oscillation of the gyroscope to either side of said position.

9. The combination with a gyroscope mounted for precession on either side of a central position, of a variable braking means for braking the same in either direction about said axis and means for varying the relative braking effect on the gyroscope in the two directions responsive to an inequality in the amplitude of precession on the two sides of said central position.

10. The combination with an oscillatory body, of a gyroscope mounted thereon, an air compressor connected thereto to brake the same, means for bringing the same into action at the end of the precessional cycle, and a power producing device driven by the fluid so compressed.

11. The combination with an oscillatory body, of a gyroscope mounted thereon, an elastic fluid compressor secured to said gyroscope for braking the same and means for storing the fluid so compressed.

12. The combination with an oscillatory body, of a gyroscope mounted thereon, a fluid compressor connected thereto to brake the same, a reservoir for the fluid so compressed, a normally closed passage for placing said compressor and reservoir in communication and means operable by said gyroscope for opening said passage.

13. The combination with an oscillatory body, of a gyroscope mounted thereon, a fluid compressor connected thereto to brake the same, a reservoir for the fluid so compressed, a normally closed passage for placing said compressor and reservoir in communication and means responsive to the speed of precession of the gyroscope for opening said passage.

14. The combination with an oscillatory body, of a gyroscope mounted thereon, a fluid compressor connected thereto to brake the same, a reservoir for the fluid so compressed, a normally closed passage for placing said compressor and reservoir in communication, means responsive to the speed of precession of the gyroscope for opening said passage, and means responsive to a further increase in said speed for closing said passage.

15. The combination with a gyroscope mounted for precession about an axis, an air pump connected therewith adapted to brake the gyroscope, means for rendering said pump operative whenever the speed of precession of the gyroscope exceeds a predetermined amount and also when the gyroscope approaches the end of its precessional swing about said axis, and a means for utilizing the air so energized to perform useful work on the gyroscope.

16. The combination with a gyroscope mounted for precession about an axis, an air pump connected therewith adapted to brake the gyroscope, and means for driving said pump as an engine to accelerate the gyroscope under predetermined conditions.

17. In gyroscopic apparatus, a double acting brake cylinder, a piston therein, a reservoir connected to the ends of said cylinder, and valve mechanism for causing one end of said cylinder to act as a pump to fill the reservoir.

18. In gyroscopic apparatus, a double acting brake cylinder, a piston therein, a reservoir connected to the ends of said cylinder, valve mechanism for causing one end of said cylinder to act as a pump to fill the reservoir, and valve mechanism for admitting a charge from said reservoir into the other end of said cylinder at the start of a working stroke.

19. The combination with a ship, of a gyroscope mounted thereon, means for braking the precession of said gyroscope in each direction and means for varying the relative braking effect on one side of the central position of the gyroscope following and responsive to the extent of precession on the other side of said central position.

20. In gyroscopic apparatus, a brake cylinder, a piston therein, a source of motive fluid, valve mechanism for admitting a charge from said source and means responsive to the precessional velocity of the gyroscopic apparatus for exhausting said charge.

21. The combination with a gyroscope mounted for precession about an axis of a brake cylinder and piston secured thereto, valve gear for each end of said cylinder, control means responsive to the extent of precession for governing one of said gears and control means responsive to the speed of precession for governing the other gear.

22. A source of power comprising the combination with a vessel, a gyroscope mounted thereon for precession with respect thereto, an elastic fluid pump connected to said gyroscope for braking its precession, a pressure equalizing chamber, a heat applying device for heating said fluid, and a power means adapted to be driven by the compressed fluid.

23. The combination with a gyroscope mounted for precession about an axis, of energy storing means for braking the same about said axis, and means for utilizing the energy stored by said braking means to apply a torque about said axis.

24. The combination with a gyroscope mounted for precession about an axis, of energy storing means for braking the same about said axis, and means for utilizing the energy stored by said braking means to apply a torque about said axis and to drive the rotor of the gyroscope.

25. The combination with a gyroscope mounted for precession about an axis, of elastic means for braking the same about said axis, and means for utilizing the energy imparted to said elastic means to apply a torque about said axis.

26. The combination with a gyroscope mounted for precession about an axis, of a braking means therefor adapted to brake the same at a predetermined rate, and supplemental means brought into action by the increase in the speed of precession for increasing the braking effect of said first named means.

27. The combination with an oscillatory body, of a gyroscope mounted thereon, an elastic fluid compressor secured to said gyroscope for braking the same, a source of compressed fluid and control means for placing said compressor into and out of communication with said source for the purpose specified.

28. The combination with a vessel, a gyroscope mounted thereon for precession with respect thereto, an elastic fluid pump connected to said gyroscope for braking its precession, a pressure equalizing chamber, and a power producing device adapted to be driven by the compressed fluid.

29. The combination with a gyroscope, of a common means for arresting the precessional motions in the last part and accelerating precessional motions in the first part of an oscillation of the gyroscope by means of energy stored during the arresting action, and means for governing said first mentioned means.

30. The combination with a floating body, of means for absorbing the rocking energy imparted thereto by the waves and converting it into power comprising a gyroscope mounted thereon for precession about an axis on rolling of the ship about a second axis, and regenerative means for absorbing the precessional energy of the gyroscope as it approaches the limit of its movement in each direction and converting it into power.

31. In a gyroscopic stabilizer, the combination with the rotor, of means for spinning the same, means for accelerating the precession of the the gyroscope at intervals, regenerative means for limiting the precessional speed at intervals and for decelerating the precession of said gyroscope at intervals, and means for supplying power regenerated by said last named means to said first and second named means.

In testimony whereof I have affixed my signature.

ALEXANDER E. SCHEIN.